US007702963B2

(12) United States Patent
Wallace et al.

(10) Patent No.: US 7,702,963 B2
(45) Date of Patent: Apr. 20, 2010

(54) METHODS AND SYSTEMS FOR CLOCK SIGNAL DISTRIBUTION AND FAULT LOCATION DETECTION IN A MULTI-SHELF MODULAR COMPUTING SYSTEM

(75) Inventors: Robert L. Wallace, Apex, NC (US); Gary C. Messer, Raleigh, NC (US); Phillip C. Jerzak, Raleigh, NC (US)

(73) Assignee: Tekelec, Morrisville, NC (US)

( * ) Notice: Subject to any disclaimer, the term of this patent is extended or adjusted under 35 U.S.C. 154(b) by 1041 days.

(21) Appl. No.: 10/978,904

(22) Filed: Nov. 1, 2004

(65) Prior Publication Data

US 2006/0095809 A1    May 4, 2006

(51) Int. Cl.
*G06F 11/00* (2006.01)
(52) U.S. Cl. .................. 714/43; 714/4; 714/22
(58) Field of Classification Search ............ 714/4, 714/5, 14, 22, 34, 43
See application file for complete search history.

(56) References Cited

U.S. PATENT DOCUMENTS

| 4,873,687 A | * | 10/1989 | Breu ........................ 714/4 |
| 5,530,363 A | * | 6/1996 | Gaughan et al. ............ 324/509 |
| 5,546,023 A | * | 8/1996 | Borkar et al. ................ 326/93 |
| 6,325,636 B1 | * | 12/2001 | Hipp et al. .................... 439/61 |
| 6,658,580 B1 | * | 12/2003 | Bell et al. .................... 713/400 |
| 7,095,735 B2 | * | 8/2006 | Pike et al. .................... 370/360 |
| 7,159,062 B2 | * | 1/2007 | Byers et al. .................. 710/305 |
| 2003/0061313 A1 | * | 3/2003 | Soetemans .................. 709/220 |

OTHER PUBLICATIONS

"Advanced TCA™ PICMG 3.0 Short Form Specification," PCI Industrial Computers Manufacturers Group, Jan. 2003.

* cited by examiner

*Primary Examiner*—Robert Beausoliel
*Assistant Examiner*—Joseph D Manoskey
(74) *Attorney, Agent, or Firm*—Jenkins, Wilson, Taylor & Hunt, P.A.

(57) ABSTRACT

A method and system are described for distributing at least one clock signal between shelves in a multi-shelf modular computing system includes a clock signal generator for generating a first clock signal, an inter-shelf bus for carrying the first clock signal to a second shelf, and a first shelf manager module, associated with the second shelf, for receiving and regenerating the first clock signal and providing the regenerated first clock signal to at least one module within the second shelf. A system and method for detecting a location of a fault in an inter-shelf bus in a multi-shelf modular computing system is also disclosed. A power source applies a bias between at least two conductors of the inter-shelf bus. At least one module detects the applied bias to determine if a fault is located between the at least one shelf and the power source.

44 Claims, 10 Drawing Sheets

METHODS AND SYSTEMS FOR CLOCK SIGNAL DISTRIBUTION AND FAULT LOCATION DETECTION IN A MULTI-SHELF MODULAR COMPUTING SYSTEM

TECHNICAL FIELD

The subject matter disclosed relates to signal distribution and fault detection, and more particularly to clock signal distribution and fault location detection between shelves in a multi-shelf modular computing system.

RELATED ART

The PCI Industrial Computer Manufacturers Group (PICMG) defines open architecture modular computing components that can be quickly integrated to deploy high performance services solutions. The PICMG 3.0 Advanced Telecommunications Computing Architecture (ATCA) specification offers guidelines on the design of ATCA compliant boards and systems.

Figure 1:
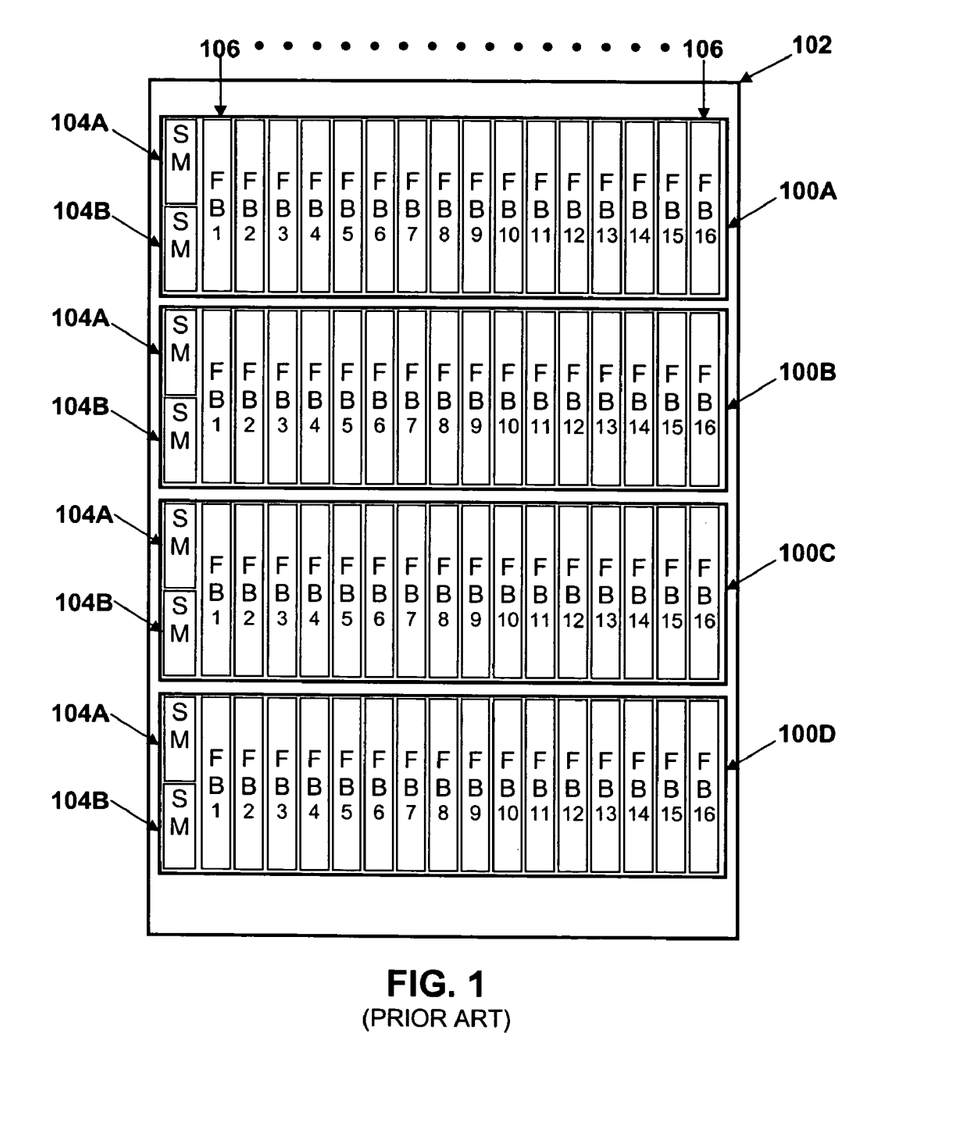
FIG. 1 is a schematic diagram illustrating a frontal view of an exemplary conventional ATCA system in an enclosure.

FIG. 1 is a frontal view illustrating an exemplary conventional ATCA system. Four shelves 100A-D are shown mounted within a support enclosure 102, often referred to simply as a rack. Each shelf 100A-D includes first and second shelf manager modules (SM) 104A and 104B and a number of front board modules (FB) 106. Currently, the ATCA specification calls for a maximum of sixteen FBs 106 per shelf, but this is subject to change as the ATCA specification evolves. Each shelf also includes a midplane with connectors for mating to FBs 106, cooling devices, power supplies, external connections for communicating with networks, additional electronics, and the necessary hardware to keep everything in place. Although four shelves 100A-D are shown in a single rack in the example of FIG. 1, an ATCA system can include more or less shelves 100A-D and/or can span multiple racks.

Each first SM 104A performs a variety of management tasks for the respective shelf 100A-D. Some of the tasks include monitoring managed devices, such as FBs 106, and reporting anomalous conditions to a system manager and taking corrective actions to prevent system failure. The system manager is the highest-level management entity and is responsible for managing one or more shelves and possibly one or more systems. SM 104A also handles hot-swap events from removable devices, such as FBs 106, indicating their entry into the shelf and detecting their shutdown or removal, negotiates power budgets with FBs 106 and other devices so that the shelf operates within power capacities, and initiates changes in fan levels when event messages show that temperatures are outside prescribed limits.

FBs 106 and SMs 104A and 104B have connectors that connect to mating connectors on the midplane within the shelf in an ATCA system. FBs 106 and SMs 104A and 104B also have one or more connectors that connect to mating connectors on a rear transition module (RTM) that is located in the rear portion of the shelf. RTMs are typically used to simplify the servicing of FBs 106 and SMs 104A and 104B by providing for the termination of input and output cable assemblies and other user defined connections on the RTM instead of on FB 106 or SMs.

The ATCA specification also provides for a synchronization clock interface in the form of a set of clock buses that enable applications that require the exchange of synchronous timing information, e.g., clock signals, among multiple FBs 106 in a single shelf. Many telecommunications applications using the ATCA architecture interface external networks that require strict timing relationships between multiple interfaces and the external network. The ATCA specification is silent, however, with respect to sharing clock signals between multiple shelves.

Other multi-shelf systems, such as Tekelec's EAGLE® STP platform, use point-to-point wiring for distributing clock signals from the clock source directly to each of the shelves receiving the clock signal. That is, a shelf generating a clock signal has a direct connection to every other shelf receiving the clock signal. This approach requires a large number of conductors. It is desirable to keep the number of conductors between shelves to a minimum within the system.

Moreover, when a fault in the cabling between the shelves is detected, it is desirable to have the ability to determine a location of the fault. Such a determination allows a technician to more rapidly locate the fault, thus shortening system down time and saving labor costs.

A need therefore exists for a clock signal distribution method and system for reliably distributing clock signals between shelves in a multi-shelf modular computing system reliably and with a limited number of conductors. A need also exists for a system and method for determining a location of a fault in a multi-shelf modular computing system.

SUMMARY

According to one aspect, a system for distributing at least one clock signal between shelves in a multi-shelf modular computing system includes a clock signal generator for generating a first clock signal, an inter-shelf bus for carrying the first clock signal from a first shelf to a second shelf, and a first shelf manager module, associated with the second shelf, for receiving and regenerating the first clock signal and providing the regenerated first clock signal to at least one module within the second shelf and for providing the first clock signal from the shelf. The shelf manager module of the second shelf provides the first clock signal to at least one other shelf in the multi-shelf modular computing system.

According to another aspect, a method for distributing at least one clock signal between shelves in a multi-shelf modular computing system includes generating a first clock signal via a first module supported by a first shelf in a multi-shelf modular computing system. The first clock signal is provided to a shelf manager module of a second shelf in the multi-shelf modular computing system. The first clock signal is regenerated at the shelf manager module of the second shelf and the regenerated first clock signal is provided to at least one module within the second shelf. The first clock signal is provided from the shelf manager module of the second shelf to at least one other shelf in the multi-shelf modular computing system.

According to another aspect, a system for distributing at least one clock signal between shelves in a multi-shelf modular computing system includes logic configured to generate a first clock signal via a first module supported by a first shelf in a multi-shelf modular computing system, logic configured to provide the first clock signal to a shelf manager module of a second shelf in the multi-shelf modular computing system, logic configured to regenerate the first clock signal at the shelf manager module of the second shelf, and logic configured to provide the regenerated first clock signal to at least one module within the second shelf and provide the first clock signal from the second shelf to at least one other shelf in the multi-shelf modular computing system.

According to another aspect, a system for detecting a location of a fault in an inter-shelf bus in a multi-shelf modular computing system includes an inter-shelf bus for carrying signals and data between shelves of the multi-shelf modular computing system, a power source for applying a bias between at least two conductors of the inter-shelf bus, and at least one module for detecting the applied bias at at least one shelf of the multi-shelf modular computing system and determine that a fault is located between the at least one shelf and the power source when the applied bias is below a threshold.

According to another aspect, a method for detecting a location of a fault in an inter-shelf bus in a multi-shelf modular computing system includes applying, using a power source, a bias between at least two conductors of the inter-shelf bus. The applied bias is detected at at least one shelf of the multi-shelf modular computing system. When the applied bias is below a threshold, a fault location is determined to be between the at least one shelf and the power source.

According to another aspect, a system for detecting a location of a fault in an inter-shelf bus in a multi-shelf modular computing system includes logic configured to apply, using a power source, a bias between at least two conductors of the inter-shelf bus, logic configured to detect the applied bias at at least one shelf of the multi-shelf modular computing system, and logic configured to determine, when the applied bias is below a threshold, that a fault is located between the at least one shelf and the power source.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Thus, the invention can be embodied in many different forms, and all such forms are contemplated to be within the scope of what is claimed. Any such form of embodiment can be referred to herein as "logic configured to" perform a described action, or alternatively as "logic that" performs a described action.

Figure 2:
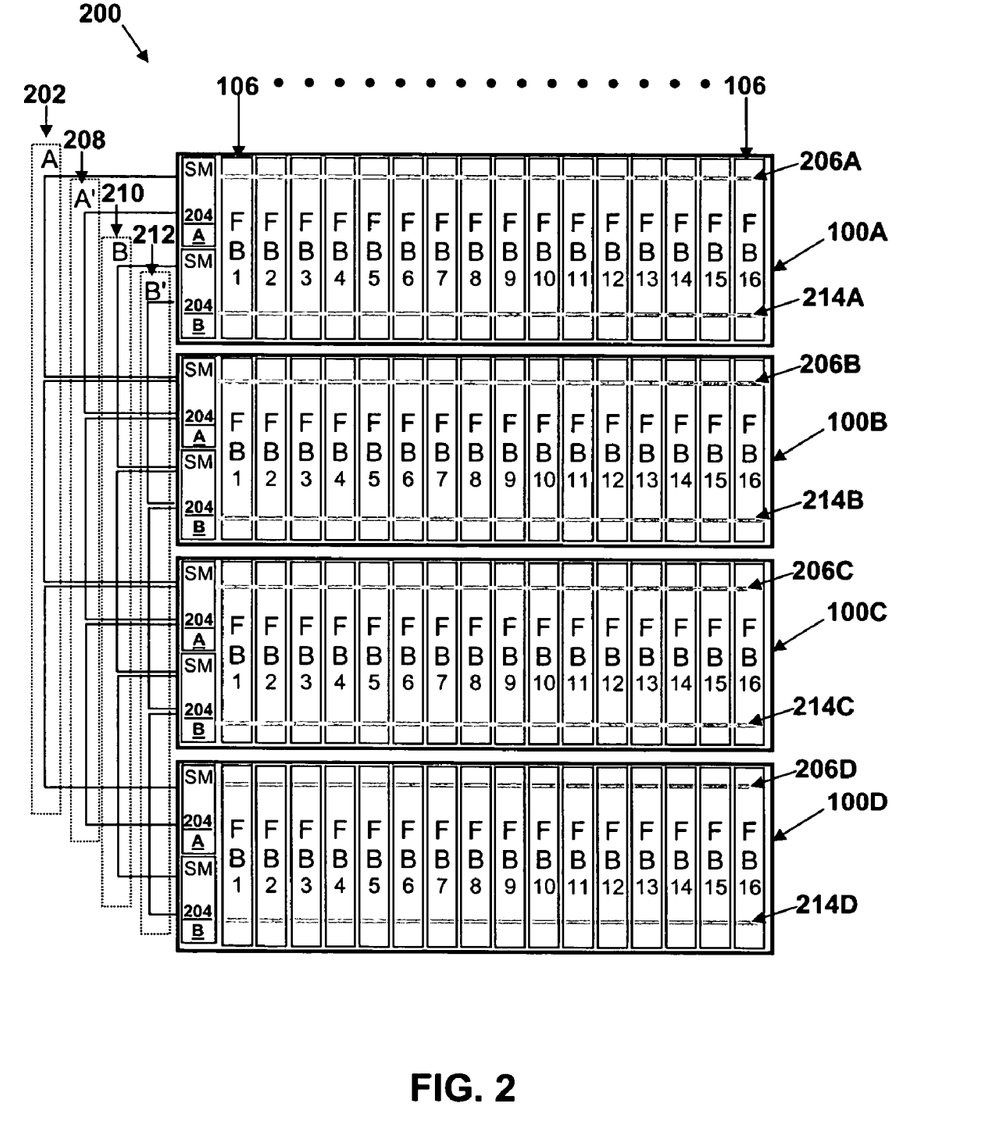
FIG. 2 is a block diagram illustrating an exemplary system for distributing at least one clock signal between shelves in a multi-shelf modular computing system according to an embodiment of the subject matter described herein.

FIG. 2 is a block diagram illustrating an exemplary system 200 for distributing at least one clock signal A between shelves in a multi-shelf modular computing system. The system includes an inter-shelf bus 202 for carrying a clock signal A between shelves. For example, a clock signal A can be generated in shelf 100A and carried via inter-shelf bus 202 to any of the other shelves 100B-D. Clock signal A can be generated by a clock signal generator in the respective SM 204A or an FB 106 in shelf 100A. Alternatively, the clock signal can be received from an external network by an FB 106 or SM 204A, as discussed further below. In any of these cases, clock signal A is said to be generated "via" a module supported by shelf 100A. In cases where an FB 106 module is employed, clock signal A is carried to SM 204A over an intra-shelf bus 206A associated with the shelf. Intra-shelf busses 206A-D are typically integral to the midplanes for the respective shelves. As with the exemplary multi-shelf modular computing system illustrated in FIG. 1, system 200 illustrated in FIG. 2 includes first and second shelf managers 204A and 204B for managing FBs 106 within each shelf. In addition, shelf managers 204A and 204B distribute clock signals between shelves.

Once clock signal A reaches another shelf 100B-D, a first SM 204A associated with the shelf receives clock signal A and provides clock signal A to at least one other shelf 100B-D via inter-shelf bus 202. The SM 204A that receives clock signal A regenerates clock signal A and provides the regenerated clock signal to one or more FBs 106 in its associated shelf. For example, clock signal A may originate from shelf 100A and may be carried to shelf 100B, where clock signal A is received and regenerated in associated SM 104A for one or more FBs 106 in shelf 100B. From SM 100A in shelf 100B, clock signal A can be carried to shelf 100C, where the process is repeated. Thus, clock signal A may be distributed between shelves using a daisy-chain distribution scheme. As a result, clock signal A can be carried between any two or more shelves 100A-D with as little as a single pair of conductors in inter-shelf bus 202.

Accordingly, a system for distributing at least one clock signal A between shelves 100A-D in a multi-shelf modular computing system includes logic configured to generate first clock signal A via a module supported by a first shelf in a multi-shelf modular computing system and logic configured to provide first clock signal A to an SM 204A of a second shelf in the multi-shelf modular computing system. The system also includes logic configured to regenerate first clock signal A at SM 204A of the second shelf, and logic configured to provide regenerated first clock signal A to at least one other module (FB 106) within the second shelf. The SM 204A of the second shelf 100B may provide first clock signal A to at least one other shelf 100B-D in the multi-shelf modular computing system.

In another aspect, the system includes logic configured to generate, via a second module supported by the first shelf, a second clock signal A'. Second clock signal A' is a redundant copy of first clock signal A. The system also includes logic configured to provide second clock signal A' to first SM 204A of second shelf 100B. For example, as shown in FIG. 2, a second inter-shelf bus 208 carries a redundant copy A' of first clock signal A. This arrangement offers redundancy to ensure at least one of clock signals A, A' reach their destination even under fault conditions in one of inter-shelf busses 202 and 208. The busses and driving circuitry for second inter-shelf bus 208 is preferably electrically and mechanically isolated from that of first inter-shelf bus 210 to prevent fault conditions on both inter-shelf busses 202 and 208 at the same time. For example, second clock signal A' can be provided to first shelf manager module 204A of the second shelf via at least one conductor harnessed separately from a conductor carrying first clock signal A. Busses 202 and 208 can also be electrically isolated from each other using known isolation techniques. Busses 202 and 208 may be harnessed separately and/or electrically isolated to limit the probability that faults from one bus affect the other or that both busses 202 and 208 are damaged and thus contain faults at the same time.

Second shelf managers 204B associated with each shelf may distribute clock signals B and B' between shelves and to modules within each shelf. The inter-shelf clock signals may be distributed via inter-shelf buses 210 and 212. Within each shelf, the clock signals B and B' may be distributed using intra-shelf buses 214A-D. Busses 210 and 212 are simultaneously can also be harnessed separately from each other to limit the probability that faults from one bus will affect the other or that both busses 210 and 212 damaged. The harnessing of busses 210 and 212 can be coordinated with busses 202 and 208 to require only two harnesses. For example, busses 202 and 212 can be harnessed together in a first harness while busses 208 and 210 can be harnessed together in a second harness. Accordingly, clock signals A and B' could be harnessed together and clock signals B and A' could be harnessed together, so that should one harness contain a fault, each of clock signals A or A' and B or B' would still function, providing some form of A and B clock signals.

Figure 3A:
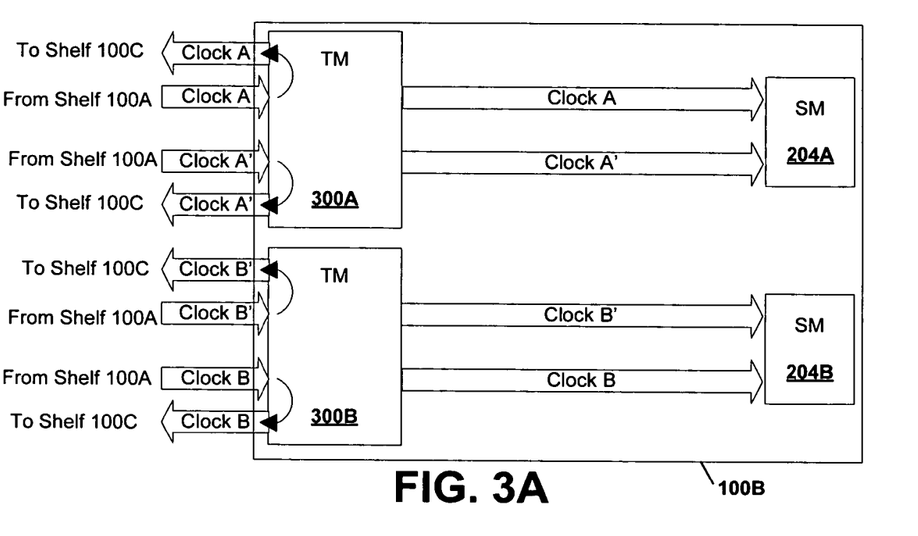
FIGS. 3A-C illustrate exemplary arrangements for distributing at least one clock signal between shelves in a multi-shelf modular computing system according to an embodiment of the subject matter described herein.

As discussed above, RTMs, referred to hereinafter simply as transition modules (TM), are typically used to simplify the servicing and upgrading of SMs 204A and 204B by providing for the termination of input and output cable assemblies and other user-defined connections on the TM instead of on the SMs 204A and 204B. For example, in order to upgrade an SM from a T1 interface to an OC-3 interface, a T1 TM can be replaced with an OC-3 TM without a hardware change on the corresponding SM. FIG. 3A shows the addition of TMs 300A and 300B, which are associated with SMs 204A and 204B of shelf 100. SMs 204A and 204B of shelf 100B are used by way of example, but it should be understood that TMs 300A and 300B can be associated with SMs 204A and 204B, which are associated with shelves 100A-D, and all or some of SMs 204A and 204B may have other respective TMs associated with them. In the example illustrated in FIG. 3A, clock signals A and A' are received at TM 300A from shelf 100A and forwarded to SM 204A as well as being provided to the next shelf 100C. Similarly, clock signals B and B' are received from shelf 100A at TM 300B and forwarded to SM 204B as well as being provided to the next shelf 100C. Thus, in the example in FIG. 3A, if either of TMs 300A or 300B fail, the A or B clocks would be lost by downstream shelves.

Figure 3B:
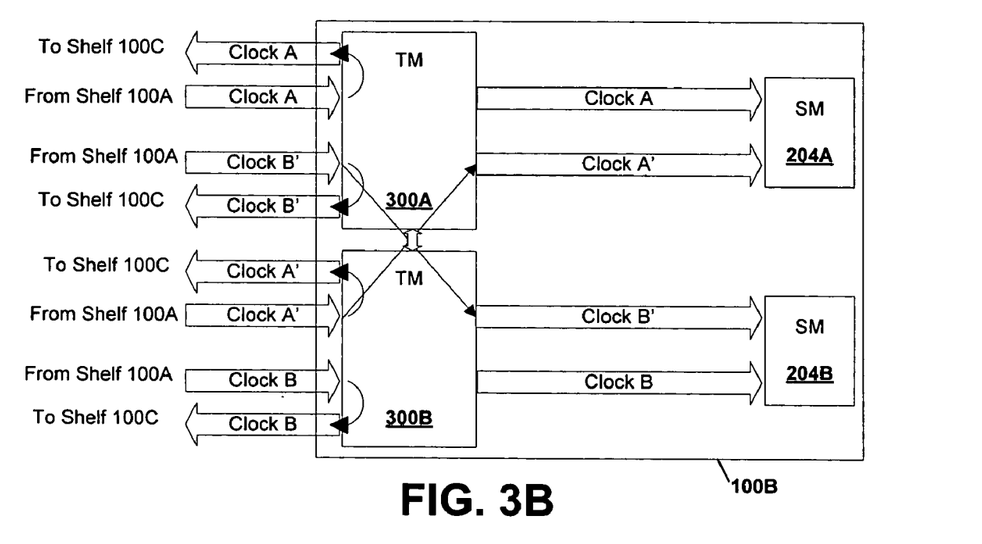

In an alternate clock distribution scheme, additional redundancy can be gained by employing the arrangement of FIG. 3B. In FIG. 3B, TMs 300A and 300B are associated with SMs 204A and 204B of shelf 100B, respectively. In this arrangement, however, clock signals A and B' are received from shelf 100A at TM 300A and forwarded to the next shelf 100C. Similarly, clock signals B and A' are received from shelf 100A at TM 300B and forwarded to the next shelf 100C. TMs 300A and 300B provide the clock signals A' and B' to each other. Signals A and A' are provided to SM 204A by TM 300A, and signals B and B' are forwarded to SM 204B by TM 300B. This arrangement adds another layer of redundancy because redundant clock signals A and A' are distributed separately all the way up to the associated TM, as are clock signals B and B'. As a result, failure of either of TMs 310A or 310B would not result in a total loss of the A or B clocks to downstream modules. For example, if TM 300A fails, downstream TMs would still get A' and B clock signals from TM 300B. Since A' is a copy of A and B is a copy of B', the downstream modules would still have all of the required system clocks. However, when one of TMs 300A and 300B fails, the A or B clocks would be lost to modules within the shelf in which TMs 300A and 300B reside.

Figure 3C:
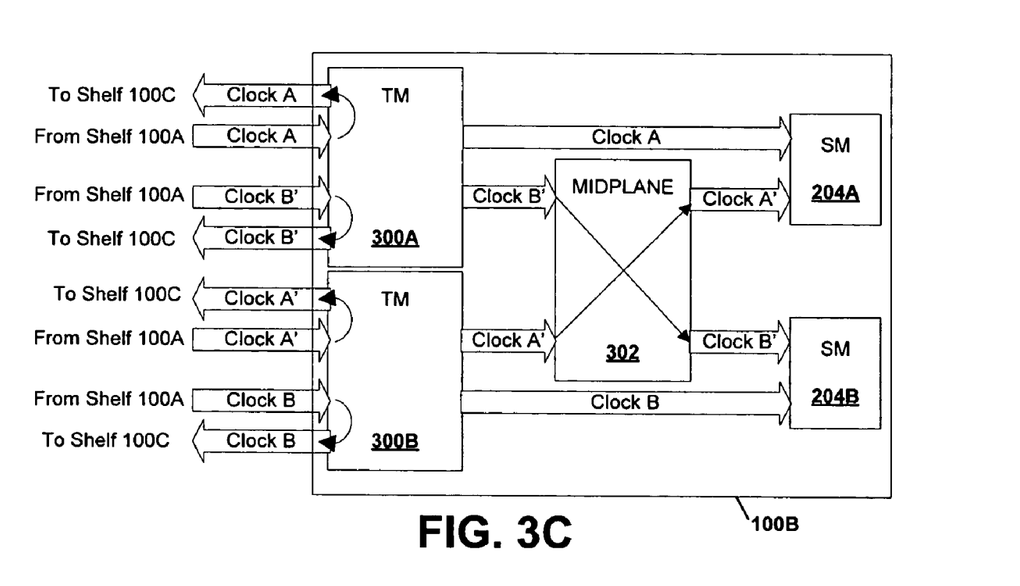

In yet another alternate implementation, even more redundancy can be gained by employing the arrangement of FIG. 3C. In this arrangement, clock signals A and B' are received from shelf 100A at TM 300A and forwarded to the next shelf 100C. Similarly, clock signals B and A' are received at TM 300B and forwarded to the next shelf 100C. TMs 300A and 300B then each provide signals A' and B', respectively, to a midplane 302 for the shelf on which TMs 300A and 300B reside, where the signals are provided to SMs 204A and 204B, respectively. Signal A is provided to SM 204A by TM 300A and signal B is provided to SM 204B by TM 300B. This arrangement adds yet another layer of redundancy because redundant clock signals A and A' are distributed separately all the way up to the associated TM, as are B and B', just as before. In addition the failure of one of TMs 300A and 300B will not prevent at least one of A and A' and at least one of B and B' from reaching their respective SMs 204A or 204B.

Figure 4:
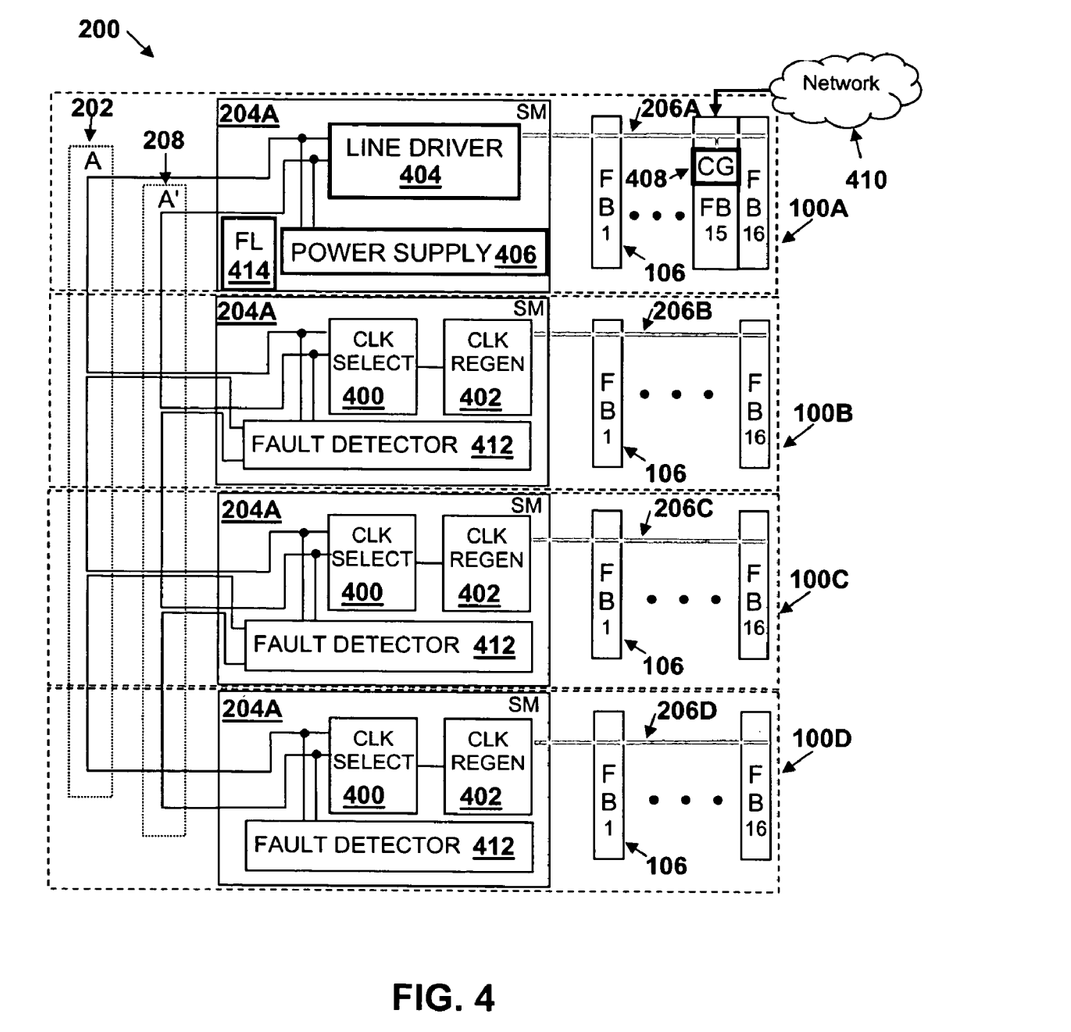
FIG. 4 illustrates an exemplary system for distributing at least one clock signal between shelves and for detecting a location of a fault in an inter-shelf bus in a multi-shelf modular computing system according to an embodiment of the subject matter described herein.

FIG. 4 is a block diagram illustrating system 200 of FIG. 2 in more detail. In FIG. 4, only A clock signals and associated shelf managers are shown and the TMs have been omitted for clarity. It is understood that the B shelf managers would be configured similarly to distribute the B clocks and that any of the TM redundancy mechanisms illustrated in FIGS. 3A-3C can be used in combination with SMs 204A associated with shelves 100A-D illustrated in FIG. 4. SMs 204A are shown along with their associated FBs 106. Each SM 204A includes a clock selector 400 and a clock regenerator 402. Clock selector 400 and clock regenerator 402 for SM 204A of shelf 100A are not shown for clarity purposes, but not to imply their absence from SM 204A of shelf 100A. A line driver 404 and power supply 406 are also shown only in SM 204A of shelf 100A for clarity purposes, but not to imply their absence from SMs 204A of shelves 100B-D. In both cases, SMs 204A of each shelf can contain all the functionality so that the fault detection functionality described below can be implemented on any of shelves 100A-D. Moreover, additional or fewer SMs 204A can be employed.

In operation, a clock signal A may be generated by a clock generator 408 in an FB, in this case FB15 associated with shelf 100A. Alternatively, clock signal A may be generated by an external source in network 410 and provided to one of the FBs. Alternatively, or in addition, clock signal A may be generated by the external source in network 410 and provided to one of the SMs. The clock signal A is provided to line driver 404 via intra-shelf bus 206A. Alternatively, the clock signal A can be generated by a clock generator (not shown) within associated SM 204A of shelf 100A. In any case, the line driver 404 drives bus 202 to provide the clock signal A to at least one other SM 204A of another shelf. Bus 208 can also be employed to carry redundant clock signals A', which are provided by line driver 404 based on the original clock signal A. In the example shown, the clock signal A and redundant clock signal A' are provided to SM 204A of shelf 100B directly via inter-shelf busses 202 and 208, respectively. One of the clock signals A and A' is then selected by clock selector 400 of shelf 100B for internal distribution within shelf 100B. The selected clock signal is regenerated by clock regenerator 402 in shelf 100B and provided to the associated FBs 106 for shelf 100B via intra-shelf bus 206B. The clock signals A and A' are also forwarded to SM 204A of shelf 100C via respective inter-shelf busses 202 and 208, where one of the clock signals A and A' is selected by clock selector 400 of shelf 100C, regenerated by clock regenerator 402 of shelf 100C, and provided to the associated FBs 106 for shelf 100C via intra-shelf bus 206C. Each SM 204A may also include a fault detector 412 for detecting clock distribution faults. The same clock distribution scheme may be used for each shelf.

In the simplest case, only one clock signal A is provided and redundant clock signal A' may be omitted. In such a case, clock selectors 400 may be omitted, since there is no selection to make. When a second bus 208, however, is employed to provide redundant clock signals A' to each shelf, clock selectors 400 are used to determine which clock signal, A or A', to provide to the FBs via the respective intra-shelf bus 206A-D. Moreover, when clock signals B and B' are also employed, additional clock select and clock regeneration logic are employed on SMs 204B.

Figure 5A:
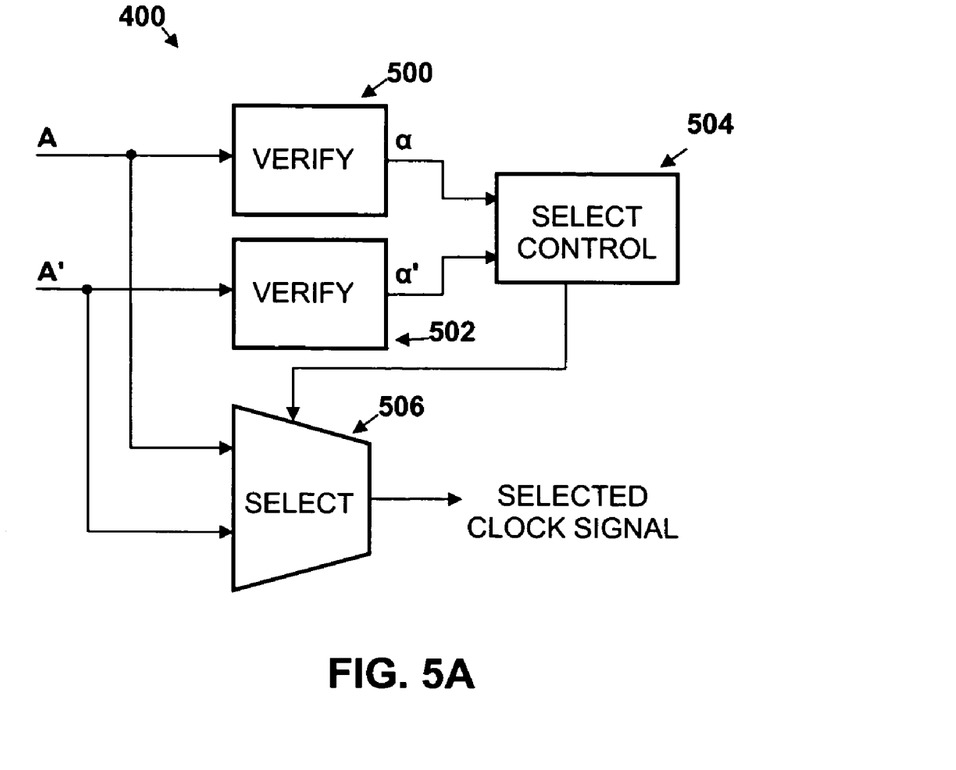
FIG. 5A is a logic diagram illustrating clock select determination logic according to an embodiment of the subject matter described herein.

FIG. 5A is a logic diagram illustrating an exemplary clock selector 400 according to an embodiment of the subject matter described here. Referring to FIG. 5A, clock selector 400 includes logic 500 configured to verify first clock signal A, logic 502 configured to verify second clock signal A', selector control logic 504 for controlling selection of one of the clock signals and selector 506 for selecting the clock signal. Verification logic 500 and 502 checks that the respective clock signal is present and can also check one or more of a number of characteristics of the signal, such as frequency, duty cycle, amplitude, wave shape, and the like, using methods known to those skilled in this art. For example, a reference clock signal can be compared to the clock signal to see if any deviation of the clock signal from the reference exceeds an allowable threshold to stay within system parameters. Selector 506 and selector controller 504 are configured to select second clock signal A' for distribution to modules supported by the second shelf when first clock signal A fails verification, and otherwise to select first clock signal A. For example, when selector controller 504 receives a verification indication α and α' for clock signals A and A' from verify logic 500 and 502, respectively, selector controller 504 sends a select signal to a selector 506 to select one of the clock signals A and A'.

Figure 5B:
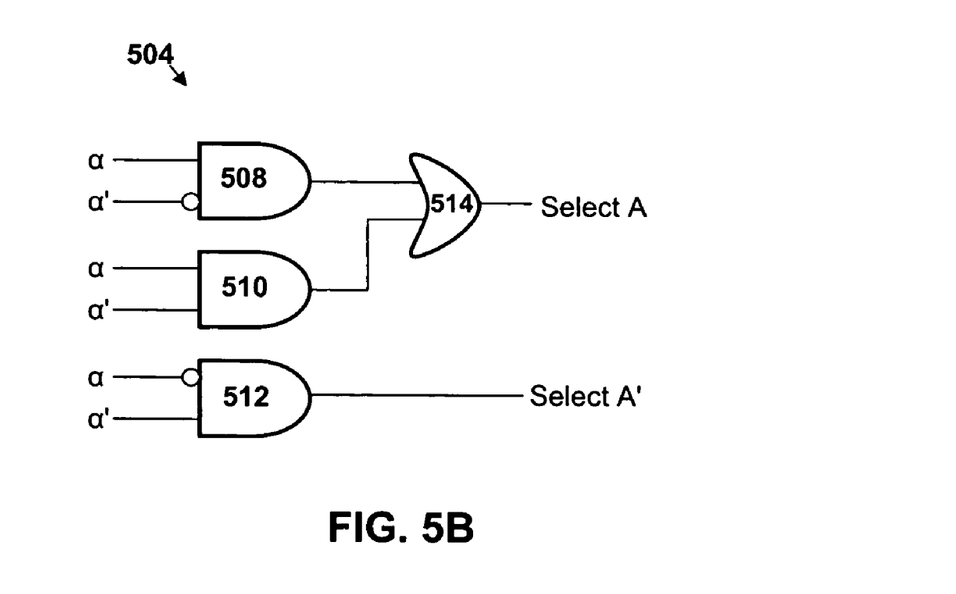
FIG. 5B is a logic diagram illustrating one possible implementation of the select control according to an embodiment of the subject matter described herein.

FIG. 5B is a logic diagram illustrating an exemplary implementation of select controller 504. In FIG. 5B, select controller 504 includes three AND gates 508, 510, and 512, and an OR gate 514. When clock signal A is verified, verification indication a is logic '1', and is otherwise logic '0'. Similarly, when clock signal A' is verified, verification indication a' is logic '1', and is otherwise logic '0'. Accordingly, as one of ordinary skill in this art will appreciate from the logic diagram, A' clock signal is selected for distribution to FBs when clock signal A fails verification, i.e., when a is logic '0', and clock signal A is otherwise selected.

Figure 6:
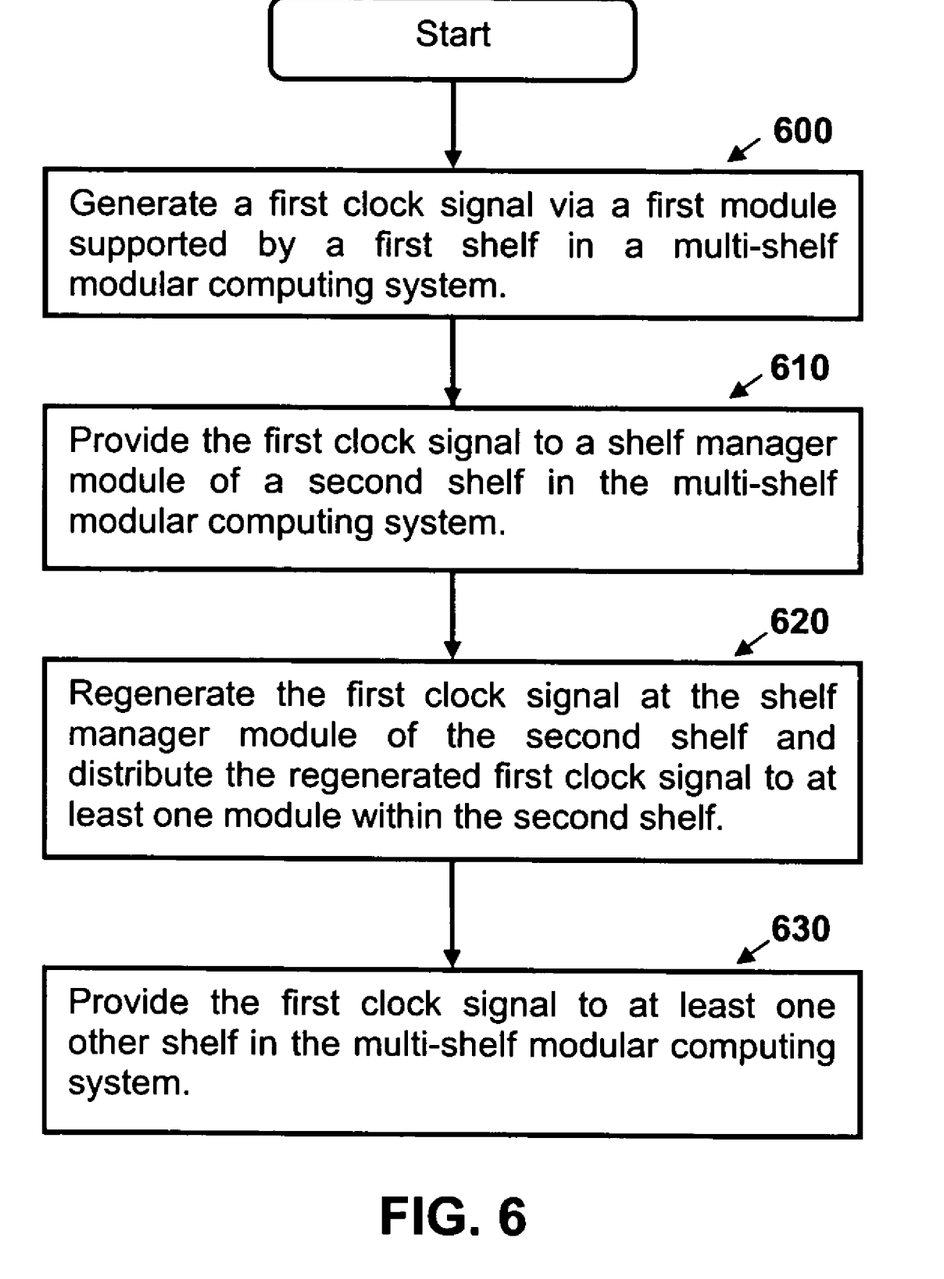
FIG. 6 is a flow chart illustrating a method for distributing at least one clock signal between shelves in a multi-shelf modular computing system according to an embodiment of the subject matter described herein.

FIG. 6 is a flow chart illustrating a method for distributing at least one clock signal between shelves in a multi-shelf modular computing system. A first clock signal is generated (step 600) via a first module supported by a first shelf in a multi-shelf modular computing system. The first clock signal is provided (step 610) to a shelf manager module of a second shelf in the multi-shelf modular computing system. The first clock signal is regenerated (step 620) at the shelf manager module of the second shelf and the regenerated first clock signal is provided to at least one module within the second shelf. The first clock signal is provided (step 630) to at least one other shelf in the multi-shelf modular computing system.

With reference again to FIG. 4, according to another aspect, a system for detecting a location of a fault in an inter-shelf bus in a multi-shelf modular computing system is disclosed. For example, the system can be used to locate faults in inter-shelf busses 202 and 208 (and/or 210 and 212) of the clock signal distribution system described above. The inter-shelf busses include at least two conductors each for carrying signals and data between shelves having SMs 204A of multi-shelf modular computing system. Power supply 406 is configured to apply a bias between the conductors of each inter-shelf bus 202 and 208. Here, the power source can be a DC or AC voltage or current source to apply a voltage or current bias between the conductors. For example, a battery can be employed. As described above, SMs 204A include fault detectors 412 for detecting the applied bias at at least one shelf of the multi-shelf modular computing system. Fault detectors 412 are employed to determine whether a fault is located between their respective shelf and power supply 406 when the applied bias is below a threshold at fault detector 412.

Note, however, that although only one power supply 406 is shown in FIG. 4 in SM 204A, power supply 406 can be located in any or all of SMs 204A. Alternatively, an external power supply can be utilized. One power supply 406 is typically sufficient to perform fault location detection as described herein, although more than one may be employed. A fault detector is omitted from SM 204A of shelf 100A in FIG. 4 for clarity and its omission is not intended to imply that SM 204A or shelf 100A does not include a fault detector.

Accordingly, a system for detecting a location of a fault in an inter-shelf bus in a multi-shelf modular computing system includes logic configured to apply, using power supply 406, a bias between at least two conductors of inter-shelf bus 202, fault detectors 412 configured to detect the applied bias at at least one shelf of the multi-shelf modular computing system, and a fault locator 414 configured to determine, when the applied bias is below a threshold, that a fault is located between the at least one shelf and power source 406. Fault locator 414 may be connected to fault detectors 412 via a bus (now shown) that is separate from the inter-shelf clock distribution busses.

During normal operation, SMs 204A carry on normal processes and communicate normally at least via inter-shelf busses 202 and 208. When a fault is reported within the system for inter-shelf bus 202, SM 204A of shelf 100A receives a fault message and discontinues normal communications over inter-shelf bus 202. Thus, the system can also include logic configured to determine, prior to applying the bias, that a fault condition exists somewhere in the multi-shelf modular computing system. Power supply 406 then applies a bias to at least two conductors of inter-shelf bus 202 and fault detectors 412 detect the bias, if present. Fault detectors 412 may each inform fault locator 414 whether a bias is present. Based on this information, fault locator 414 may identify the location of the fault.

Figure 7:
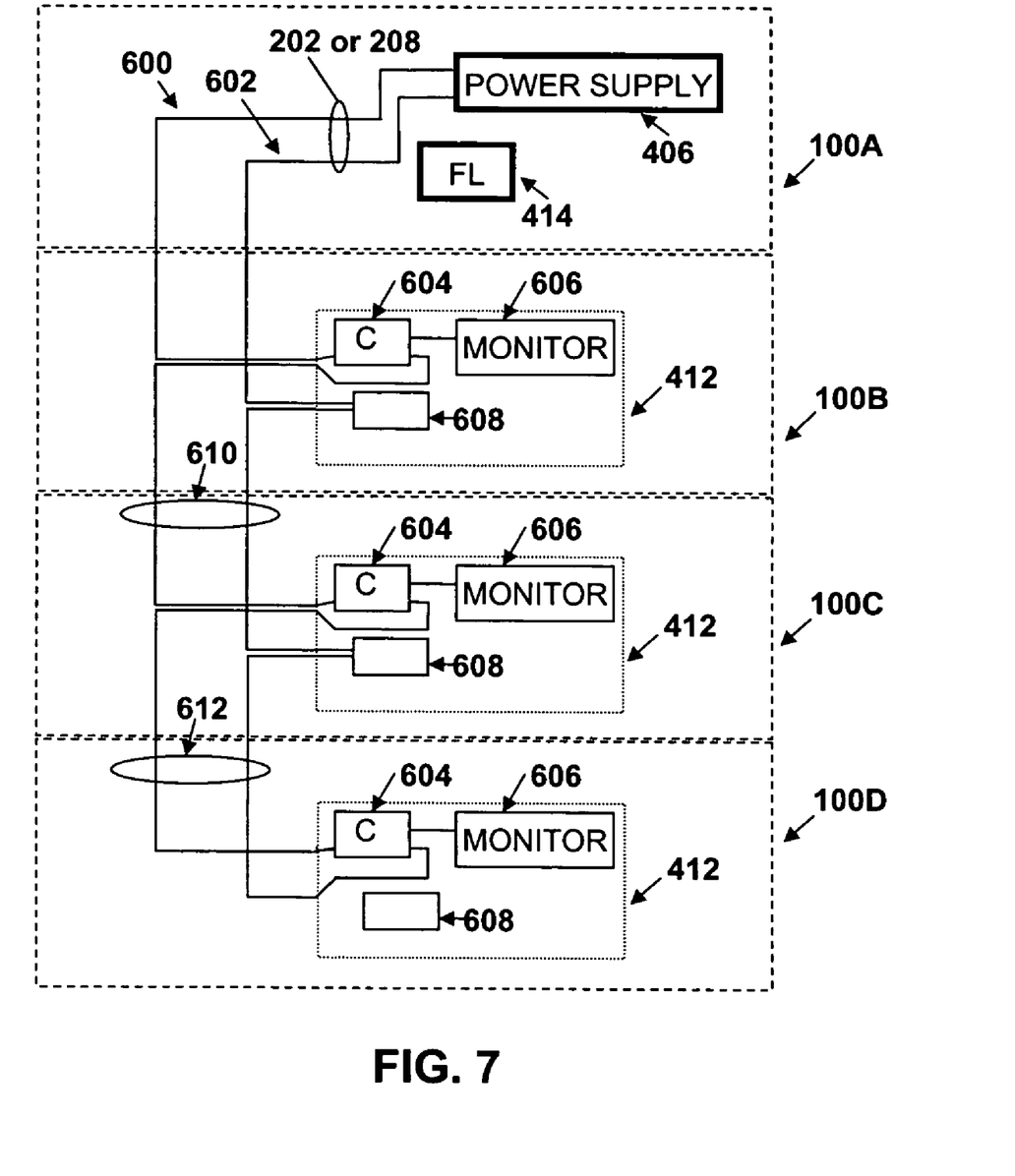
FIG. 7 is a block diagram illustrating an exemplary implementation of a system for detecting a location of a fault in an inter-shelf bus in a multi-shelf modular computing system according to an embodiment of the subject matter described herein.

FIG. 7 illustrates an exemplary implementation of a system for detecting a location of a fault in an inter-shelf bus in a multi-shelf modular computing system. Power supply 406 applies a bias between conductors 600 and 602 of inter-shelf bus 202 or 208, for example. The bias is detected (if present) at each of respective fault detectors 412. In this example, each fault detector 412 includes a respective component 604 and a monitor 606. In one exemplary implementation, each component 604 may include a resistor, and monitors 606 may each include voltage detectors for detecting a voltage drop across each resistor. Each component 604 is interposed in series with conductor 600. Conductor 602 may also include components 608, such as resistors, which are monitored and used to detect faults. However, in this example, only components 604 are shown as being monitored.

In operation, when a fault occurs, for example, at location 610 in the form of either a short between conductors 600 and 602, an open circuit on either of conductors 600 and 602, or a ground applied to one or more non-grounded conductors 600 and 602, the bias is still present at fault detector 412 of shelf 100B, but not at fault detectors 412 of shelves 100B and 100C. Accordingly, fault detector 412 of shelf 100B reports a no-fault condition to fault locator 414 while fault detectors 412 of shelves 100C and 10D report a fault condition. Fault locator 414 may thus determine, based on the fault locator's 414 knowledge of the system configuration, the fault to be located between the shelf having a fault detector reporting a no-fault condition, i.e., fault detector 412 of shelf 100B, and the nearest shelf having a fault detector reporting a fault condition, i.e., fault detector 412 of shelf 100C. Similarly, if the fault occurs at location 612, the bias is still detected at fault detectors 412 of shelves 100B and 100C, but not detected at fault detector 412 of shelf 100D. Accordingly, fault detectors 412 of shelves 100B and 100C report a no-fault condition while fault detector 412 of shelf 100D reports a fault condition. The location of the fault is thus determined by the fault locator 414 to be between shelves 100C and 100D. As discussed above, the applied bias can be a voltage or a current. Note that although components 604 and monitors 606 are shown in fault detectors 412, which is shown in associated SM 204A, the various blocks need not be located together. For example one or more of the blocks can be placed on a TM associated with the particular SM 204A.

As described above, each fault detector 412 may include a voltage detector for detecting a voltage difference across an electrical component in a path between the at least two conductors of the inter-shelf bus. For example, component 604 can be a resistor and monitor 606 can measure a voltage across the resistor. When the voltage is at or above a level associated with the applied bias, this indicates that a no-fault condition exists. When the voltage is nearer to zero, or substantially at zero, this indicates that little or no bias current is flowing through resistor and thus a fault condition exists. Accordingly, a threshold voltage (or current) value can be set under which a fault condition is said to exist.

For example, assume that power supply 406 applies a 3V bias and that each resistor is 1 ohm in resistance. Each resistor is expected to have at least a 1V voltage drop across it. In example, when no real fault exists, each of components 604 will read 1V at monitors 606. When a short occurs at location 610, monitor 606 at shelf 100B will read 3V across component and monitors 606 at shelves 100C and 100D will read near 0V across their respective resistors. When a short occurs at location 612, the monitors at shelves 100B and 100C will read 1.5V across their respective components and the monitor at shelf 100D will read 0V across their respective components. In this case, a threshold of 0.5V could be used. Each monitor 606 can compare the threshold to the voltage read from respective component 604 using a comparator. When the voltage reads above the threshold 0.5V, a no-fault condition exists between that shelf and power supply 406. Conversely, when the voltage reads below the threshold 0.5V, a fault condition exists between that shelf and power supply 406.

Alternatively, each fault detector 412 can include logic configured to measure a current flow through conductors 600 and 602. Other values such as frequency, impedance, resistance, and the like can also be measured to similarly determine the location of a fault.

The system can also include logic configured to report the results of the fault location determination to at least one module in the multi-shelf system. For example, the fault conditions can be reported to a system manager module (not shown). In addition, the system can include logic configured to activate a local status indicator to indicate the results of the fault location determination. For example, an SM can include an LED on its faceplate that indicates the fault status. Moreover, the system can include logic configured to report the results of the fault location determination to a remote monitoring station via a network (not shown) accessible by the multi-shelf modular computing system.

Figure 8:
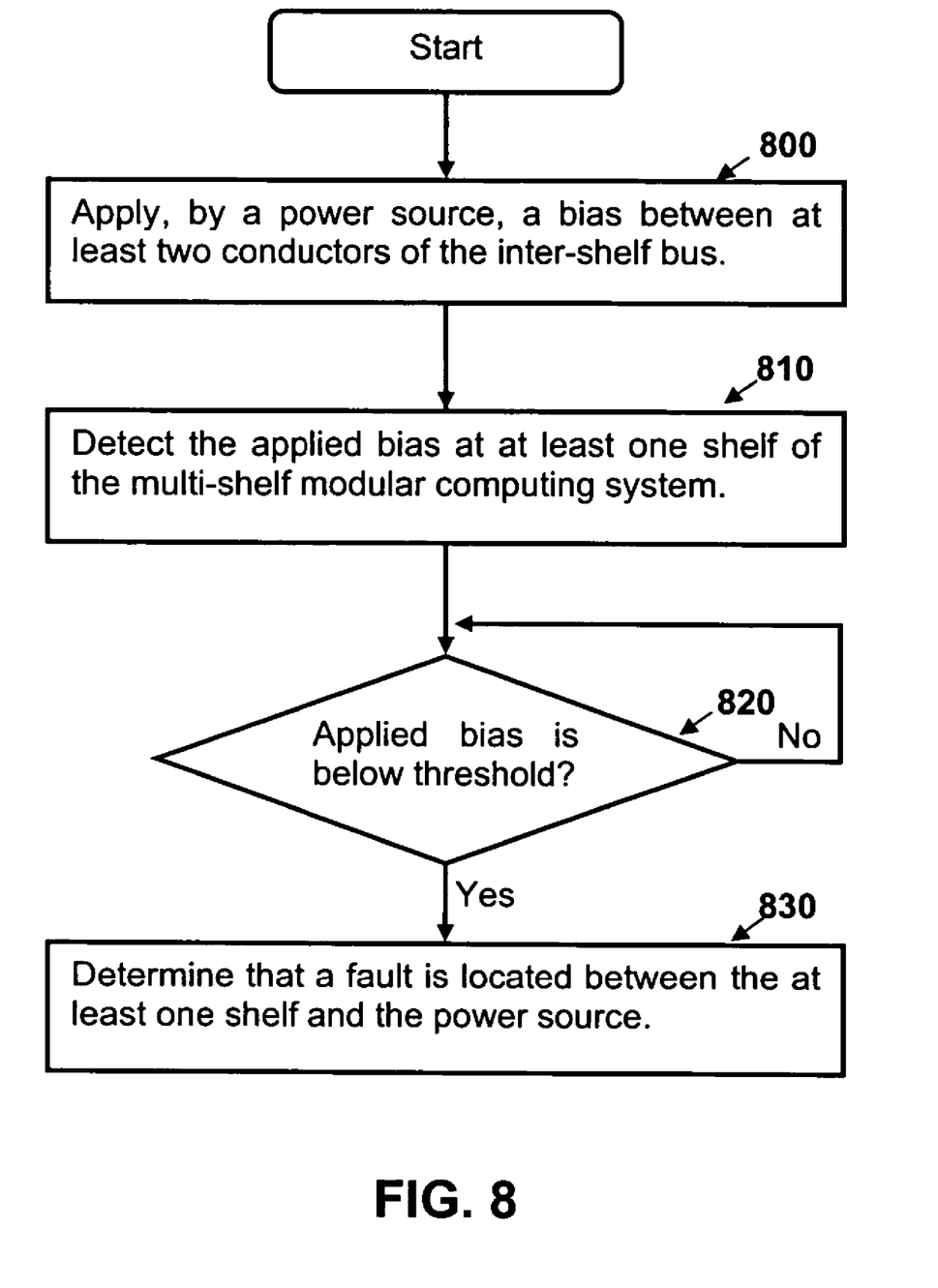
FIG. 8 is a flow chart illustrating a method for detecting a location of a fault in an inter-shelf bus in a multi-shelf modular computing system according to an embodiment of the subject matter described herein.

FIG. 8 is a flow chart illustrating a method for detecting a location of a fault in an inter-shelf bus in a multi-shelf modular computing system. A power source applies (step 800) a bias between at least two conductors of the inter-shelf bus. The applied bias is detected (step 810) at at least one shelf of the multi-shelf modular computing system. When the applied bias is below a threshold (step 820), it is determined (step 830) that a fault is located between the at least one shelf and the power source.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for distributing at least one clock signal between shelves in a multi-shelf modular computing system, the method comprising:

(a) generating a first clock signal that includes synchronous timing information via a first module supported by a first shelf in a multi-shelf modular computing system;

(b) providing the first clock signal from the first shelf to a shelf manager module of a second shelf in the multi-shelf modular computing system using a daisy-chain distribution scheme;

(c) regenerating the first clock signal at the shelf manager module of the second shelf and distributing the regenerated first clock signal to at least one module within the second shelf;

(d) providing the first clock signal from the second shelf to at least one other shelf in the multi-shelf modular computing system using the daisy-chain distribution scheme; and (e) providing a second clock signal that is a copy of the first clock signal from the first shelf to the second shelf and from the second shelf to the at least one additional shelf using a path between the first shelf, the second shelf, and the at least one other shelf that is separate from a path used to distribute the first clock signal from the first shelf, to the second shelf, and to the at least one other shelf, and thereby forming a double daisy-chain distribution scheme for the first and second clock signals.

2. The method of claim 1, wherein generating a first clock signal via a first module includes generating the first clock signal at the first module.

3. The method of claim 1, wherein generating a first clock signal via a first module includes generating the first clock signal external to the first module and providing the first clock signal to the first module.

4. The method of claim 1, wherein the first module is a shelf manager module for the first shelf.

5. The method of claim 1, comprising:
generating, via a second module supported by the first shelf, the second clock signal; and
wherein providing the second clock signal to the second shelf includes providing the second clock signal to the shelf manager module of the second shelf.

6. The method of claim 5, wherein providing the second clock signal to the shelf manager module of the second shelf comprises providing the second clock signal to the shelf manager module of the second shelf via at least one conductor harnessed separately from a conductor carrying the first clock signal.

7. The method of claim 5, comprising:
verifying the first clock signal at the shelf manager module of the second shelf;
verifying the second clock signal at the shelf manager module of the second shelf; and
selecting the second clock signal for distribution to modules supported by the second shelf when the first clock signal fails verification, otherwise selecting the first clock signal.

8. The method of claim 1, comprising, responsive to receiving an indication that the first clock signal is not received at at least one shelf of the multi-shelf modular computing system:
applying, using a power source, a bias between at least two conductors used to carry the first clock signal;
detecting the applied bias at at least one shelf of the multi-shelf modular computing system; and
determining, when the applied bias is below a threshold, that a fault is located between the at least one shelf and the power source.

9. The method of claim 1, wherein the multi-shelf modular computing system is a PCI Industrial Computer Manufacturers Group (PICMG) Advanced Telecommunications Computing Architecture (ATCA) compliant system.

10. A method for detecting a location of a fault in an inter-shelf bus in a multi-shelf modular computing system, the method comprising:
at an inter-shelf bus in a multi-shelf modular computing system that distributes at least a first clock signal that includes synchronous timing information between shelves using a daisy-chain distribution scheme and that distributes a second clock signal that is a copy of the first clock signal between the shelves using a path that is separate from a path used to distribute the first clock signals between the shelves, thereby forming a double daisy-chain distribution scheme for the first and second clock signals:

(a) applying, using a power source, a bias between at least two conductors of the inter-shelf bus;

(b) detecting the applied bias at at least one shelf of the multi-shelf modular computing system; and (c) determining, when the applied bias is below a threshold, that a fault is located between the at least one shelf and the power source.

11. The method of claim 10, wherein the applied bias is a voltage bias.

12. The method of claim 10, wherein the applied bias is a current bias.

13. The method of claim 10, wherein detecting the applied bias comprises measuring a voltage difference across an electrical component in a path between the at least two conductors of the inter-shelf bus.

14. The method of claim 13, wherein the electrical component is a resistor.

15. The method of claim 10, wherein detecting the applied bias comprises measuring a current flow between the at least two conductors of the inter-shelf bus.

16. The method of claim 10, comprising prior to applying the bias, determining that a fault condition exists somewhere in the multi-shelf modular computing system.

17. The method of claim 10, comprising reporting the results of the fault location determination to at least one module in the multi-shelf system.

18. The method of claim 10, comprising activating a local status indicator to indicate the results of the fault location determination.

19. The method of claim 10, comprising reporting the results of the fault location determination to a remote monitoring station via a network accessible by the multi-shelf modular computing system.

20. A system for distributing at least one clock signal between shelves in a multi-shelf modular computing system, the system comprising:

(a) a clock generator for generating a first clock signal that includes synchronous timing information via a first module supported by a first shelf in a multi-shelf modular computing system;

(b) a first clock provider for providing the first clock signal to a shelf manager module of a second shelf in the multi-shelf modular computing system using a daisy-chain distribution scheme;

(c) a clock regenerator for regenerating the first clock signal at the shelf manager module of the second shelf and distributing the regenerated first clock signal to at least one module within the second shelf;

(d) a second clock provider for providing the first clock signal to at least one other shelf in the multi-shelf modular computing system using the daisy-chain distribution scheme; and (e) means for providing a second clock signal that is a copy of the first clock signal from the first shelf to the second shelf and from the second shelf to the at least one other shelf using a path between the first shelf, the second shelf, and the at least one other shelf that is separate from a path used to distribute the first clock signal from the first shelf, to the second shelf, and to the at least one other shelf, and thereby forming a double daisy-chain distribution scheme for the first and second clock signals.

21. The system of claim 20, wherein the first clock signal is generated by the first module.

22. The system of claim 20, wherein the first clock signal is generated external to the first module and provided to the first module.

23. The system of claim 20, wherein the first module is a shelf manager module for the first shelf.

24. The system of claim 20, comprising:
a second clock generator for generating, via a second module supported by the first shelf, the second clock signal; and
wherein the means for providing includes a third clock provider for providing the second clock signal to the shelf manager module of the second shelf.

25. The system of claim 24, wherein the means for providing includes at least one conductor harnessed separately from a conductor carrying the first clock signal.

26. The system of claim 24, comprising:
a first clock verifier for verifying the first clock signal at the shelf manager module of the second shelf;
a first clock verifier for verifying the second clock signal at the shelf manager module of the second shelf; and
a clock distributor for selecting the second clock signal for distribution to modules supported by the second shelf when the first clock signal fails verification, and otherwise select the first clock signal.

27. The system of claim 20, comprising a fault detector for, in response to receiving an indication that the first clock signal is not received at at least one shelf of the multi-shelf modular computing system:
applying, using a power source, a bias between at least two conductors used to carry the first clock signal;
detecting the applied bias at at least one shelf of the multi-shelf modular computing system; and
determining, when the applied bias is below a threshold, that a fault is located between the at least one shelf and the power source.

28. A system for distributing at least one clock signal between shelves in a multi-shelf modular computing system, the system comprising:
(a) a clock signal generator associated with a first shelf in a multi-shelf modular computing system for generating a first clock signal that includes synchronous timing information;
(b) an inter-shelf bus for carrying the first clock signal from the first shelf to a second shelf in the multi-shelf modular computing system using a daisy-chain distribution scheme;
(c) a first shelf manager module, associated with the second shelf, for receiving and regenerating the first clock signal and providing the regenerated first clock signal to at least one module within the second shelf and for providing the first clock signal to at least one other shelf in the multi-shelf modular computing system using the daisy-chain distribution; and
(d) means for providing a second clock signal that is a copy of the first clock signal from the first shelf to the second shelf and from the second shelf to the at least one other shelf using a path between the first shelf, the second shelf, and the at least one other shelf that is separate from a path used to distribute the first clock signal from the first shelf, to the second shelf, and to the at least one other shelf, and thereby forming a double daisy-chain distribution scheme for the first and second clock signals.

29. The system of claim 28, comprising:
a line driver for receiving the first clock signal from the clock signal generator and for generating the second clock signal; and
wherein the means for providing includes a second inter-shelf bus for carrying the second clock signal to the second shelf.

30. The system of claim 29, comprising a first transition module, associated with the first shelf manager module, for receiving the first and second clock signals at the second shelf and providing the first and second clock signals to the first shelf manager module.

31. The system of claim 29, comprising:
a first transition module, associated with the first shelf manager module, for receiving the first clock signal at the second shelf;
a second shelf manager associated with the second shelf; and
a second transition module, associated with the second shelf manager for receiving the second clock signal;
wherein the second transition module provides the second clock signal to the first transition module, which provides the second clock signal to the first shelf manager.

32. The system of claim 29, comprising:
a first transition module, associated with the first shelf manager module, for receiving the first clock signal at the second shelf;
a second shelf manager associated with the second shelf;
a second transition module, associated with the second shelf manager for receiving the second clock signal; and
a midplane associated with the second shelf;
wherein the second transition module provides the second clock signal to the first shelf manager via the midplane.

33. The system of claim 28, wherein the multi-shelf modular computing system is a PCI Industrial Computer Manufacturers Group (PICMG) Advanced Telecommunications Computing Architecture (ATCA) compliant system.

34. A system for detecting a location of a fault in an inter-shelf bus in a multi-shelf modular computing system, the system comprising:
a first path that distributes a first clock signal that includes synchronous timing information between shelves using a daisy-chain distribution scheme;
a second path separate from the first path that distributes a second clock signal that is a copy the first clock signal between the shelves such that the first and second paths form a double daisy chain distribution scheme for the first and second clock signals;
an applicator for applying, using a power source, a bias between at least two conductors of the inter-shelf bus;
a detector for detecting the applied bias at at least one shelf of the multi-shelf modular computing system; and
a first determiner for determining, when the applied bias is below a threshold, that a fault is located between the at least one shelf and the power source.

35. The system of claim 34, wherein the applied bias is a voltage bias.

36. The system of claim 34, wherein the applied bias is a current bias.

37. The system of claim 34, wherein the detector measures a voltage difference across an electrical component in a path between the at least two conductors of the inter-shelf bus.

38. The system of claim 37, wherein the electrical component is a resistor.

39. The system of claim 34, wherein the detector measures a current flow between the at least two conductors of the inter-shelf bus.

40. The system of claim 34, comprising a second determiner for determining, prior to applying the bias, that a fault condition exists in the multi-shelf modular computing system.

41. The system of claim 34, comprising a reporter for reporting the results of the fault location determination to at least one module in the multi-shelf system.

42. The system of claim 34, comprising an activator for activating a local status indicator to indicate the results of the fault location determination.

43. The system of claim 34, comprising a results reporter for reporting the results of the fault location determination to a remote monitoring station via a network accessible by the multi-shelf modular computing system.

44. A system for detecting a location of a fault in an inter-shelf bus in a multi-shelf modular computing system, the system comprising:
a first path that distributes a first clock signal that includes synchronous timing information between shelves using a daisy-chain distribution scheme;
a second path separate from the first path that distributes a second clock signal that is a copy the first clock signal between the shelves such that the first and second path form a double daisy chain distribution scheme for the first and second clock signals;
an inter-shelf bus for carrying signals and data between shelves of the multi-shelf modular computing system;
a power source for applying a bias between at least two conductors of the inter-shelf bus; and
at least one fault detector for detecting the applied bias at at least one shelf of the multi-shelf modular computing system and determine that a fault is located between the at least one shelf and the power source when the applied bias is below a threshold.

* * * * *